United States Patent
Tsai et al.

(10) Patent No.: US 11,916,471 B2
(45) Date of Patent: Feb. 27, 2024

(54) POWER SUPPLY SWITCHING FROM POWER SOURCES

(71) Applicant: Hewlett-Packard Development Company, L.P., Spring, TX (US)

(72) Inventors: Ting-Yang Tsai, Taipei (TW); Yi-Chen Chen, Taipei (TW); Ching-Lung Wang, Taipei (TW); Yu-Min Shen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 17/636,064

(22) PCT Filed: Oct. 18, 2019

(86) PCT No.: PCT/US2019/056937
§ 371 (c)(1),
(2) Date: Feb. 17, 2022

(87) PCT Pub. No.: WO2021/076151
PCT Pub. Date: Apr. 22, 2021

(65) Prior Publication Data
US 2022/0286038 A1 Sep. 8, 2022

(51) Int. Cl.
*H02M 1/10* (2006.01)
*G06F 1/26* (2006.01)

(52) U.S. Cl.
CPC .............. *H02M 1/10* (2013.01); *G06F 1/263* (2013.01)

(58) Field of Classification Search
CPC ........... H02M 1/10; G06F 1/263; Y02D 10/00

USPC .......................................................... 307/29
See application file for complete search history.

(56) References Cited

U.S. PATENT DOCUMENTS

| | | | |
|---|---|---|---|
| 6,865,094 B2 | 3/2005 | Malik et al. | |
| 7,032,119 B2 | 4/2006 | Fung | |
| 7,325,050 B2 | 1/2008 | O'Connor et al. | |
| 8,242,359 B2 | 8/2012 | McGinley et al. | |
| 2003/0188210 A1* | 10/2003 | Nakazato | G06F 1/324 713/320 |
| 2011/0060926 A1 | 3/2011 | Brooks et al. | |
| 2012/0300526 A1* | 11/2012 | Chuang | H02J 9/005 363/146 |
| 2016/0091960 A1 | 3/2016 | Ismail et al. | |

(Continued)

*Primary Examiner* — Jared Fureman
*Assistant Examiner* — Aqeel H Bukhari
(74) *Attorney, Agent, or Firm* — Knobbe, Martens, Olson & Bear, LLP (57) ABSTRACT

An example electronic device includes a controller to determine a user touch detection by a power adaptor coupled to the electronic device to operate the electronic device in an AC power mode. The power adaptor may comprise a proximity sensor to detect a user touch for detachment of the power adaptor from the electronic device, and a control circuit to operate a configuration pin in a low output mode to signal user touch detection. The controller may initiate central processing unit (CPU) throttling to reduce power consumption by the electronic device. The controller may further stop CPU throttling in response to detecting that the power adaptor has been detached from the electronic device. Further, the controller may switch the electronic device to a DC power mode to operate using DC power supplied by a battery of the electronic device in response to power adaptor detachment.

15 Claims, 6 Drawing Sheets

(56) References Cited

U.S. PATENT DOCUMENTS

2019/0157858 A1* 5/2019 Patel .................. H05K 7/20209
2021/0026430 A1* 1/2021 Nakamura ................ G06F 1/28

* cited by examiner

POWER SUPPLY SWITCHING FROM POWER SOURCES

BACKGROUND

Electronic devices, such as laptops, netbooks, notebooks, tablets, and mobile phones may operate either in an alternating current (AC) power mode or in a direct current (DC) power mode. When operating in the AC power mode, the electronic device may draw power from an AC power source using an AC power adaptor. When operating in the DC power mode, the electronic device may draw power from a DC power source, such as a battery.

BRIEF DESCRIPTION OF DRAWINGS

The detailed description is described with reference to the accompanying figures. It should be noted that the description and figures are merely examples of the present subject matter and are not meant to represent the subject matter itself.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A wide range of power consuming electronic devices, such as laptops, notebooks, netbooks, cellular telephones and other electronic devices draw power from AC power sources using AC power adaptors and/or from DC power sources, such as batteries, to power various components of the electronic device. Usually, AC power adaptors have a power rating higher than a power rating of the DC power source and may thus be able to supply power at a higher output wattage in comparison to the output wattage of the power supplied by the battery. As a result, the components of the electronic device may be able to consume higher power in the AC power mode as compared to the DC power mode. The electronic device may thus be able to operate at higher operating frequencies to process heavy work load, when powered by the AC power source. However, as the DC power source may not be able to supply the same amount of output wattage, electronic devices may not be able to operate at higher operating frequencies when operating in the DC power mode. The electronic device may operate at lower operating frequencies in the DC power mode and thus process lesser work load as compared to the AC power mode.

In cases when the power adaptor is disconnected from the electronic device, the electronic device may have to reduce the operating frequency to avoid shut down or malfunction of the electronic device due to low wattage power supply. A conventional technique describes using throttling mechanisms, such as Central Processing Unit (CPU) throttling to reduce the operating frequency of the CPU. The CPU throttling may be performed to reduce work load processed by the CPU when the power supply of the electronic device is switched from the AC power source to the DC power source. However, such throttling mechanisms are initiated after the power adaptor is disconnected from the electronic device, owing to which the power supply of the electronic device may switch from the AC power source to the DC power source with electronic device still operating at high operating frequency. Owing to such a delay in initiating the throttling mechanisms, the electronic device may exhibit abnormal behavior, such as display screen blackout or may suddenly shutdown as the electronic device may not be able to process the heavy work load using the power supplied by the battery. Time required to initiate such throttling mechanisms are further dependent on system design, configuration, and system dynamic loading. As a result, such techniques may be usable in electronic devices having a specific configuration.

The present subject matter discloses example approaches for power supply switching from power sources in an electronic device. In an example, the power supply switching from the AC power source to the DC power source is initiated upon detecting a user touch on a power adaptor connected to the electronic device for supplying power from an AC power source. In response to detecting the user touch, a controller of the electronic device may initiate a central processing unit (CPU) throttling to reduce power consumption by the electronic device. Thus, when the power adaptor is eventually detached from the electronic device, discontinuing the power supply from the AC power source, the electronic device may continue to operate in the DC power mode without malfunctioning.

In accordance to an example implementation of the present subject matter, the power adaptor includes a proximity sensor to sense a user touch on the adaptor. As the user's finger touch is detected, a control circuit of the power adaptor may determine whether an output wattage of the power adaptor is greater than an adaptor loading threshold value. If the output wattage is greater than the adaptor loading threshold value, the control circuit may operate a configuration pin of the power adaptor in a low output mode to signal a user touch detection to the electronic device. In one example, the user touch detection may be signaled to indicate a user touch on the power adaptor for detachment of the power adaptor from the electronic device.

As the configuration pin of the power adaptor operates in the low output mode, the controller of the electronic device may determine that the user touch has been detected by the power adaptor. The controller may thus initiate CPU throttling to reduce the power consumption of the electronic device. Upon initiating the CPU throttling, the controller may start monitoring the output wattage of the power adaptor to determine whether the power adaptor is detached from the electronic device. When the controller detects that the power adaptor has been detached from the electronic device, the CPU throttling may be stopped and the electronic device may switch to a DC power mode to operate on DC power supplied by the battery.

The present subject matter thus facilitates in reducing latency in initiating the CPU throttling before detachment of the AC power adaptor from the electronic device. Using the user touch detection for predicting the detachment of the AC power adaptor, provides a marginal time to the electronic device to perform power supply switching from the AC power source to the DC power source. As a result, the electronic device may be safely switched to the DC power mode even before the detachment of the AC power adaptor. Thus, instances of inadvertent failures or shutdown of the electronic devices, that may have otherwise occurred, may reduce. The electronic device may thus continue to operate in a smooth manner. Further, performing the CPU throttling before switching the electronic device to the DC power mode, may help to ensure that the battery of the electronic device is operated within a safe operating range, thereby, protecting the battery from getting damaged and increasing overall life of the battery.

The present subject matter is further described with reference to FIGS. 1 to 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1:
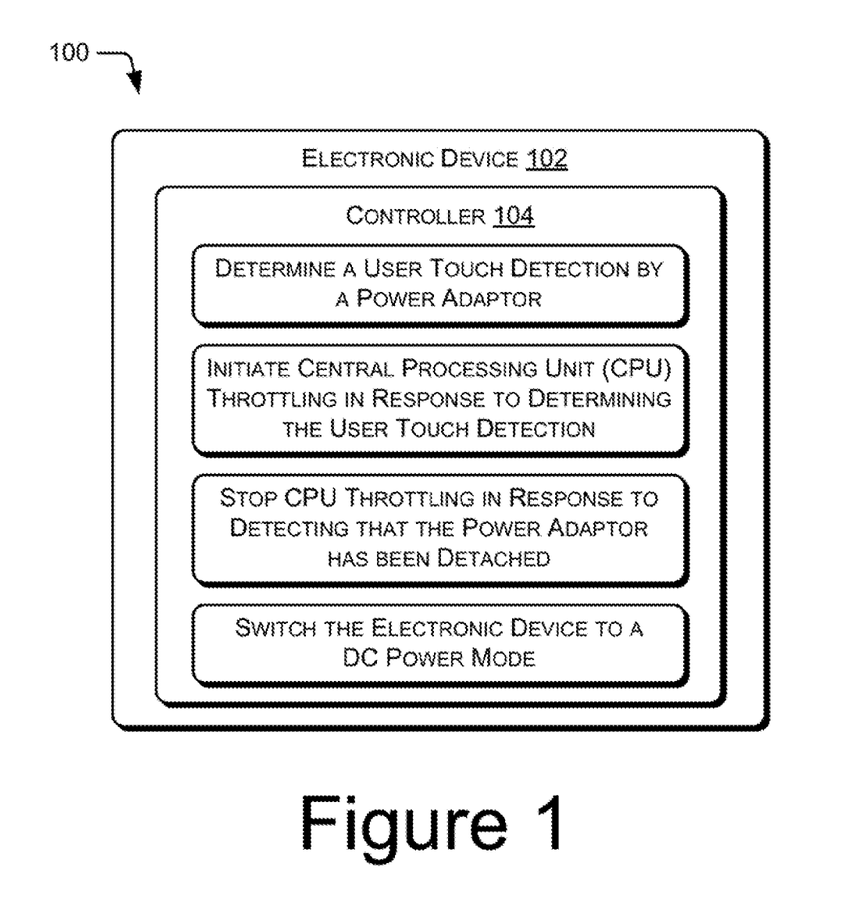
FIG. 1 illustrates an electronic device, according to an example.

FIG. 1 illustrates an electronic device 102, according to an example implementation of the present subject matter. Examples of the electronic device 102 include, but are not limited to, laptop, netbooks, notebooks, tablets, and mobile phones. In one example, the electronic device 102 may be configured to operate in either an AC power mode or a DC power mode at a time. In the AC power mode, the electronic device 102 may draw power from an AC power source using a power adaptor. In the DC power mode, the electronic device 102 may draw power from a DC power source, such as a battery. Further, the electronic device 102 may be able to switch between the AC power mode and the DC power mode depending on whether the electronic device 102 is connected to the AC power source.

In one example, the electronic device 102 may include a controller 104. The controller 104 may be a microcontroller that may handle various tasks of the electronic device 102. In an example, the controller 104 may determine a user touch detection by a power adaptor coupled to the electronic device 102. The user touch detection may indicate a user touch on the power adaptor, for example, for detachment of the power adaptor from the electronic device 102. In response to determining the user touch detection, the controller 104 may initiate a central processing unit (CPU) throttling to reduce power consumption by the electronic device 102. Initiating the CPU throttling upon detecting the user touch may facilitate in reducing the power consumption of the electronic device 102 before the power adaptor is detached, thereby, avoiding any inadvertent system failures, such as screen blackout and unwanted shut down during switching from the AC power mode to the DC power mode.

The controller 104 may subsequently start monitoring an output wattage received by the electronic device 102 from the power adaptor to determine whether the power adaptor has been detached from the electronic device 102. In one example, the controller 104 may determine that the power adaptor is coupled to the electronic device 102 when the output wattage is greater than a threshold value. The controller 104 may determine that the power adaptor is detached from the electronic device 102 when the output wattage is less than or equal to the threshold value. In one example, the threshold value may vary in a range of 0 Volts (V) to 3.2 V and may vary for different electronic devices.

In response to detecting that the power adaptor has been detached from the electronic device 102, the controller 104 may stop the CPU throttling. The controller 104 may also switch the electronic device 102 to the DC power mode to operate using the power supplied by the battery of the electronic device 102. As the power consumption of the electronic device 102 has already been reduced by performing the CPU throttling, the electronic device 102 may be switched to operate in the DC power mode without any inadvertent system failures.

Figure 2:
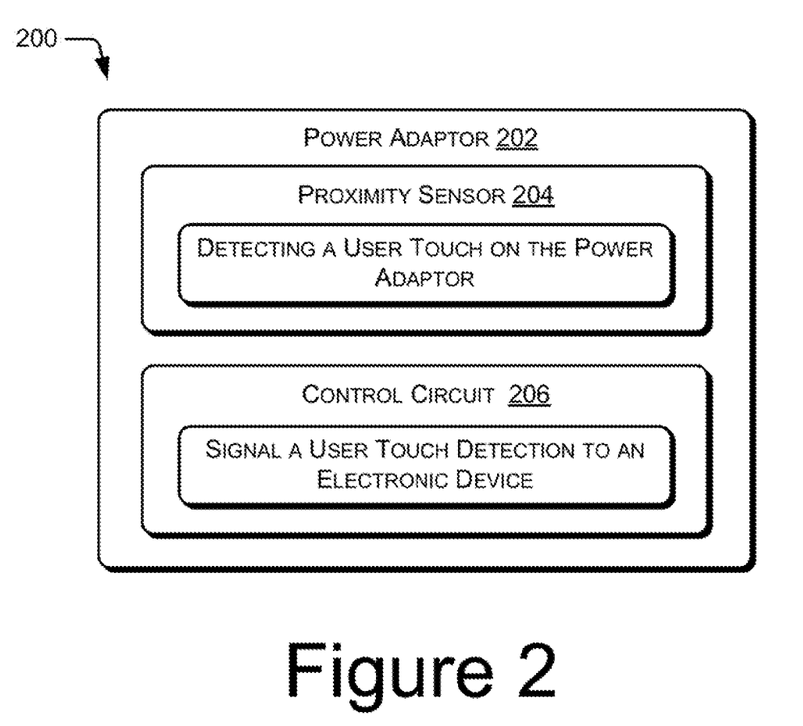
FIG. 2 illustrates a power adaptor, according to an example.

FIG. 2 illustrates a power adaptor 202, according to an example implementation of the present subject matter. The power adaptor 202 may be coupled to an electronic device, such as the electronic device 102 to operate the electronic device 102 in the AC power mode. In one example, the power adaptor 202 may be connected to an AC power source to receive AC voltage. The power adaptor 202 may convert the AC voltage to DC regulated supply compatible with the electronic device 102 to operate the electronic device 102.

In one example, the power adaptor 202 may include a proximity sensor 204 and a control circuit 206. The proximity sensor 204 may be provided to sense the user touch on the power adaptor 202. In one example, the proximity sensor 204 may sense the user touch at a location proximate to a power jack of the power adaptor 202, which connects the power adaptor 202 to the electronic device 102. In response to detecting the user touch on the power adaptor 202, the proximity sensor 204 may generate a user touch indication. The control circuit 206 may subsequently receive the user touch indication.

In one example, upon receiving the user touch detection, the control circuit 206 may determine an output wattage of the power adaptor 202 to determine whether to signal the user touch detection to the electronic device 102. If the output wattage of the power adaptor 202 is determined to be greater than an adaptor loading threshold value, the control circuit 206 may signal the user touch detection to the electronic device 102. In one example, the adaptor loading threshold value may indicate a maximum power rating at which a battery of the electronic device 102 may operate. Thus, if the output wattage of the power adaptor 202 is greater than the adaptor loading threshold value, the electronic device 102 may not be able to switch to the DC power mode.

In one example, the control circuit 206 may operate a configuration pin of the power adaptor 202 in a low output mode to signal the user touch detection to the electronic device 102 coupled to the power adaptor 202. The user touch detection indicating a user touch on the power adaptor 202 for detachment of the power adaptor 202 from the electronic device 102.

Upon receiving an indication of the user touch detection, the electronic device 102 may initiate the CPU throttling and subsequently switch to the DC power mode upon detachment of the power adaptor 202, as explained with reference to FIG. 1. Thus, detecting the user touch and signaling the user touch detection to the electronic device 102 may facilitate in reducing the power consumption of the electronic device 102 before the power adaptor is detached from the electronic device 102. Any inadvertent system failure during switching of the power supply from AC to DC power source may thereby be avoided.

Figure 3:
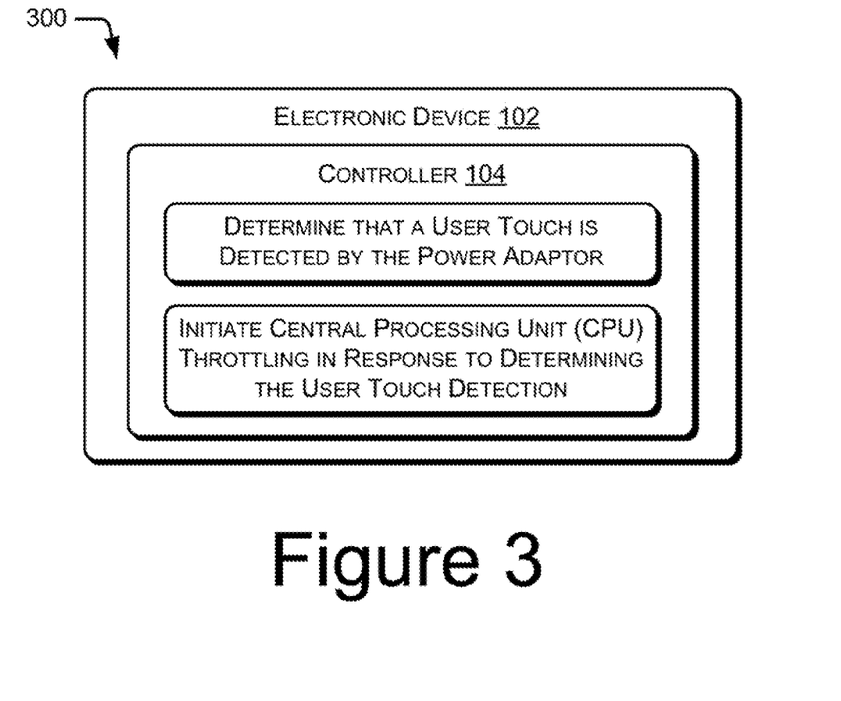
FIG. 3 illustrates an electronic device, according to another example.

FIG. 3 illustrates the electronic device 102, according to an example implementation of the present subject matter. Examples of the electronic device 102 include, but are not limited to, laptop, notebooks, tablets, and mobile phones. In one example, the electronic device 102 may operate either in an AC power mode to draw power from AC power sources or in a DC power mode to draw power from DC power sources. Further, a power adaptor, for example, the power adaptor 202, may be coupled to the electronic device 102 to operate the electronic device 102 in the AC power mode.

The electronic device 102 may include the controller 104 to determine an output mode of a configuration pin of the power adaptor 202. In one example, the controller 104 may determine that a user touch is detected by the power adaptor 202 when the configuration pin of the power adaptor 202 is operating in a low output mode. In an example, the power adaptor 202 may include the proximity sensor 204 to detect the user touch on the power adaptor 202. The power adaptor 202 may further include the control circuit 206 to operate the configuration pin in the low output mode, in response to the user touch detection. In one example, the user touch detection may indicate that a user may have touched the power adaptor 202 for detaching the power adaptor 202 from the electronic device 102. Subsequently, in response to determining the user touch detection, the controller 104 may initiate the CPU throttling to reduce power consumption by the electronic device 102.

In one example, the controller 104 may initiate the CPU throttling to avoid system failure during power supply switching from AC to DC power source when the power adaptor 202 is detached from the electronic device 102.

Figure 4:
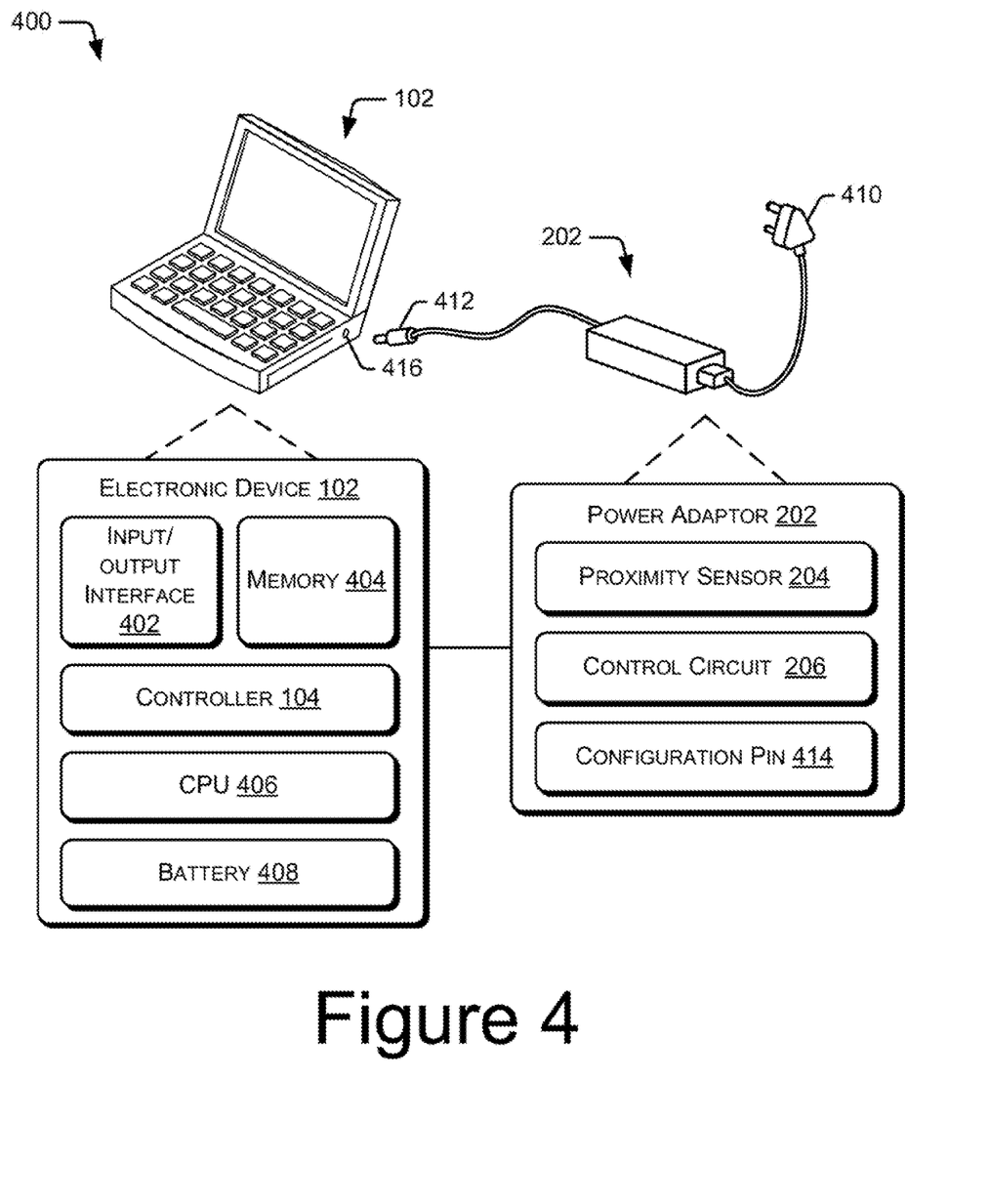
FIG. 4 illustrates a system comprising the electronic device and the power adaptor, according to an example.

FIG. 4 illustrates a system 400, according to an example implementation of the present subject matter. In one example, the system 400 may include the electronic device 102 coupled to the power adaptor 202. Examples of the electronic device 102 include, but are not limited to, laptop, notebooks, tablets, and mobile phones. Further, as previously described, the electronic device 102 may be operated in either an AC power mode or a DC power mode. The electronic device 102 may include input/output (I/O) interfaces 402, memory 404, the controller 104, a central processing unit (CPU) 406, and a battery 408. The battery 408 may provide DC power output to the electronic device 102, when the electronic device 102 is operating in the DC power mode. In an example, the battery 408 may be a single battery unit. In another example, the battery 408 may include multiple battery units. In an example, the battery 408 may be a smart battery. Examples of the battery 408 may include, but are not limited to, a Nickel-Cadmium battery, a Nickel Metal Hydride, or a Lithium Ion battery. In one example, a power rating of the battery 408 may be less than the power rating of the power adaptor 202.

The I/O interface(s) 402 may include a variety of interfaces, for example, interfaces for data input and output and interfaces for receiving power supply. In an example, the I/O interface(s) 402 may include a Universal Serial Bus (USB)-C interface for data exchange and for receiving power supply from a power adaptor having a USB-C power jack. In case of USB-C power jack, the power supply may be received using the $V_{Bus}$ pins of the USB-C power jack while the data exchange may take place using configuration channel (CC) pins. In another example, the I/O interface(s) 402 may include a barrel connecter interface for receiving power supply from a power adaptor having a barrel type power jack. The I/O interface(s) 402 may further facilitate communication between the electronic device 102 and various other computing devices connected in a networked environment. The I/O interface(s) 402 may also provide a communication pathway for one or more components of the electronic device 102.

The memory 404 may include any non-transitory computer-readable medium including, for example, volatile memory such as RAM, or non-volatile memory, such as read only memory (ROM), erasable programmable ROM, flash memories, hard disks, optical disks, and magnetic tapes. The memory 404 may store an operating system for being executed on the electronic device 102 when the electronic device 102 is in an operational stage. The memory 404 may further store one or more computer-readable instructions, which may be fetched and executed to perform various functionalities of the electronic device 102 in the operational stage. In an example, the operating system may generate event trace logs of all activities that may be performed on the electronic device 102 and the power consumed by various components of the electronic device 102, in the operational stage.

The CPU 406 may include microprocessors, microcomputers, microcontrollers, digital signal processors, state machines, logic circuitries, and/or any other devices that manipulate signals and data based on computer-readable instructions. In an example, the CPU 406 may either perform or assist the various components of the electronic device 102 to perform various functionalities of the electronic device 102. For example, the CPU 406 may fetch and execute the computer-readable instructions from the memory 404 for performing the various functionalities of the electronic device 102. The CPU 406 may further perform a real-time analysis of the various activities and functionalities being performed in the electronic device 102 to generate the event trace logs. The CPU 406 may further perform a real-time analysis of the power consumed by the electronic device 102 while performing the various activities and functionalities to generate the event trace logs. The CPU 406 may store the event trace logs in the memory 404. Further, functions of the various elements shown in the figures, including any functional blocks labeled as "CPU", may be provided through the use of dedicated hardware as well as hardware capable of executing computer-readable instructions.

As previously described, the power adaptor 202 may convert AC power, received from an AC power source, to DC power for supplying DC regulated supply to the electronic device 102. In one example, a power plug 410 of the power adaptor 202 may be connected to the AC power source to receive the AC power. Further, a power jack 412 of the power adaptor 202 may be connected to the electronic device 102 to supply the DC power to the electronic device 102 to operate the electronic device 102 in the AC power mode. In one example, the power jack 412 may be a USB-C power jack. In another example, the power jack 412 may be a barrel type power jack. The power adaptor 202 may further include the proximity sensor 204, the control circuit 206, and a configuration pin 414. In case the power jack 412 is a USB-C power jack, the configuration pin 414 may be the CC pin. In case the power jack 412 is a barrel type power jack, the configuration pin 414 may be an ID pin.

In one example, the AC power adaptor 202 may be able to supply power at a higher output wattage in comparison to the output wattage of the power supplied by the battery 408. Thus, when operating in the AC power, the CPU 406 and the components of the electronic device 102 may be able to operate at higher operating frequencies to process heavy work load. Further, when operated in the DC power mode, the CPU 406 and the components of the electronic device 102 may operate at lower operating frequencies and thus process lesser work load.

To operate the electronic device 102 in the AC power mode, a user of the electronic device 102 may connect the power adaptor 202 to the electronic device 102. The user may insert the power jack 412 in a power port 416 of the electronic device 102 to electrically couple the power adaptor 202 to the electronic device 102. Further, to discontinue the power supply from the AC power source, the user may remove the power jack 412 from the power port 416 of the electronic device 102. As the user touches the power adaptor 202, for example, at the power jack 412 or a location proximate to the power jack 412, the proximity sensor 204 may sense the user touch. In one example, the proximity sensor 204 may have a high proximity sensing accuracy to sense objects and touch that are within a very small distance. In one example, the proximity sensor 204 may have a proximity sensing range in between 0 to 0.3 millimeter (mm). In another example, the proximity sensor may have the proximity sensing range of 0 to 0.1 mm. The proximity sensor 204 thus may not be able to sense user touch on the power adaptor 202 at a location distant from the power jack 412. The proximity sensor 204 may thus not sense accidental touch or other user touch which may not be for detaching the power adaptor 202, thereby, increasing accuracy of the proximity sensor 204 in identifying user touch for detaching the power adaptor 202. In one example, the proximity sensor 204 may be provided on top of the power jack 412 such that when a user brings his/her hand near the power jack 412, the user touch is detected by the proximity sensor.

In response to detecting the user touch, the proximity sensor 204 may generate a user touch indication. In one example, the proximity sensor 204 may send a high-level voltage signal as the user touch indication to the control circuit 206 of the power adaptor 202. In response to receiving the user touch indication, the control circuit 206 may determine an output wattage of the power adaptor 202. Subsequently, the output wattage of the power adaptor 202 is compared with an adaptor loading threshold value to determine whether to signal the user touch detection to the electronic device 102. In one example, the adaptor loading threshold value may correspond to a maximum power rating at which the battery 408 of the electronic device 102 may operate. In one example, the adaptor loading threshold value may be in a range of 60-85% of the power rating of the power adaptor 202 and may vary depending on the power requirements of the electronic device 102. In another example, the adaptor loading threshold value may be in a range of 70-80% of the power rating of the power adaptor 202. In another example, the adaptor loading threshold value may be 75% of the power rating of the power adaptor 202

If the output wattage is greater than the adaptor loading threshold value, the control circuit 206 may determine that the electronic device 102 may be processing high work load that may not be handled in the DC power mode. The control circuit 206 may thus signal the user touch detection to the electronic device 102. In one example, the control circuit 206 may operate the configuration pin 414 of the power adaptor 202 in a low output mode to signal the user touch detection to the electronic device 102. In one example, in the low output mode, the configuration pin 414 may operate at logic 1.

If the output wattage is lower than the adaptor loading threshold value, the control circuit 206 may determine that the electronic device 102 may be processing low work load that may be handled in the DC power mode. The control circuit 206 may thus determine not to signal the user touch detection to the electronic device 102 and allow the configuration pin 414 to continue to operate in a high output mode. In the high output mode, the configuration pin 414 may operate at logic 0.

When the configuration pin 414 operates in the low output mode, the controller 104 may determine that the power adaptor 202 is signaling the user touch indication upon detecting a user touch. In one example, the controller 104 may regularly monitor the operating voltage of the configuration pin 414 to determine the output mode of the configuration pin 414. In one example, the configuration pin 414 may send an overpower signal indicating the change in output mode of the configuration pin 414. The overpower signal may be received by the I/O interfaces 402, such as the power port 416 of the electronic device 102. The I/O interfaces 402 may then notify the change in output mode of the configuration pin 414 as the user touch indication to the Controller 104.

The controller 104 may subsequently initiate CPU throttling to reduce the power consumption of the electronic device 102. In one example, the controller 104 may send a CPU throttling signal to the CPU 406 requesting the CPU 406 to reduce the work load being currently handled by the CPU 406. Upon receiving CPU throttling request, the CPU 406 may initiate terminating applications that may be consuming high power. As the time difference between the user touch detection and actual detachment of the power adaptor 202 may be very less, within few seconds, the CPU 406 may perform CPU throttling at a very high processing rate. This may ensure that the power consumption of the electronic device 102 is reduced before the user removes the power adaptor 202. In one example, the CPU may throttle the work load at rate of 400 Mega Hertz (MHz)/2% duty cycle.

Upon initiating the CPU throttling, the controller 104 may start monitoring the output wattage received by the electronic device 102 from the power adaptor 202 to determine whether the power adaptor 202 is connected or has it been detached from the electronic device 102. In one example, the controller 104 may compare the output wattage with a threshold value to determine whether the power adaptor 202 is connected. In one example, the threshold value may vary in a range of 0 Volts (V) to 3.2 V and may be vary for different electronic devices.

When the output wattage is greater than the threshold value, the controller 104 may determine that the power adaptor 202 is coupled to the electronic device 102. The controller 104 may then continue performing the CPU throttling while the low output signal is received from the configuration pin 414. If the output wattage is less than or equal to the threshold value, the controller 104 may determine that the power adaptor 202 has been detached from the electronic device 102. The controller 104 may thus stop the CPU throttling. In one example, the controller 104 may send a CPU throttling termination signal to the CPU 406 to stop the CPU throttling. The controller 104 may further switch the power supply mode for the electronic device 102 from the AC power mode to the DC power mode to operate the electronic device 102 on the DC power supplied by the battery 408.

In one example, upon determining that the power adaptor 202 is coupled to the electronic device 102 based on the output wattage, the controller 104 may determine whether the user is continually touching the power adaptor 202. For example, the controller 104 may determine if the configuration pin 414 is continually operating in the low output mode. In one example, the controller 104 may continue the CPU throttling in response to determining that the configuration pin 414 is continually operating in the low output mode. Further, the electronic device 102 may continue to operate in the AC power mode.

If the controller 104 detects that the configuration pin 414 has started operating in the high output mode, but the power adaptor 202 is coupled to the electronic device 102, the controller 104 may stop the CPU throttling. The controller 104 may further continue to operate the electronic device 102 in the AC power mode.

Figure 5:
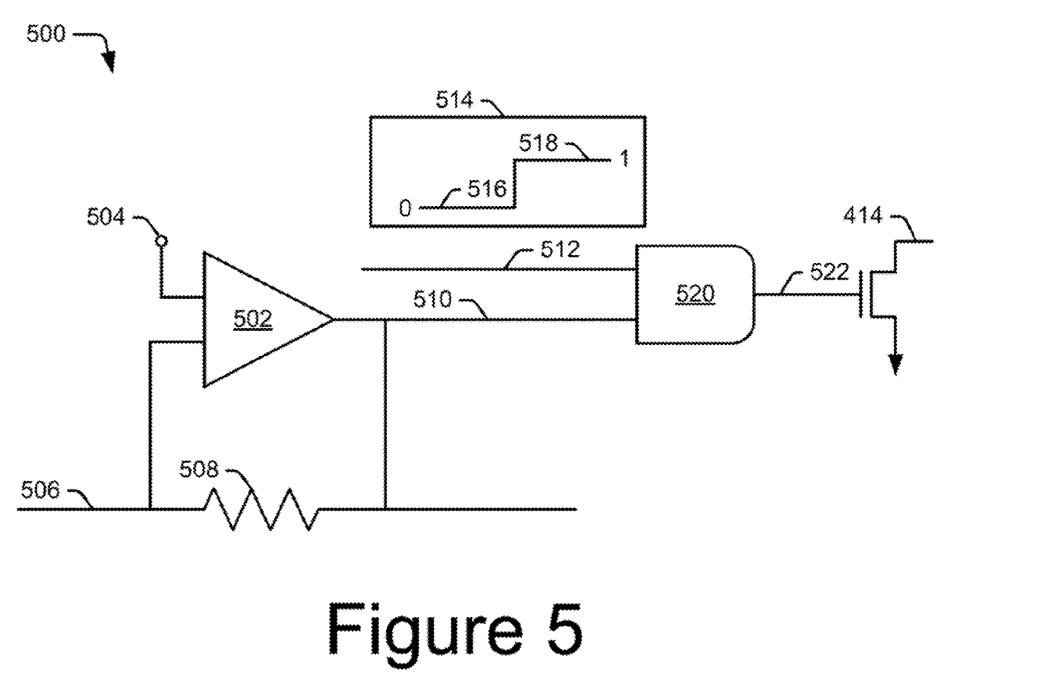
FIG. 5 illustrates a circuit diagram of a control circuit of the power adaptor, according to an example.

FIG. 5 illustrates a circuit diagram 500 of the control circuit 206 of the power adaptor 202, according to an example implementation of the present subject matter. As previously described, the control circuit 206 may operate the configuration pin 414 of the power adaptor 202 either in the low output mode or the high output mode depending on the user touch. In one example, the control circuit 206 may include a comparator 502 which may receive two inputs $V_{ref}$ 504 and $V_{adaptor}$ 506. The $V_{ref}$ 504 is a reference voltage and may define the adaptor loading threshold value. In an example, the reference voltage $V_{ref}$ 504 may be selected at the time of manufacturing the power adaptor 202. In another example, the reference voltage $V_{ref}$ 504 may be modified by a user of the electronic device 102. The $V_{adaptor}$ 506 is the output voltage of the power adaptor 202. The control circuit 206 further includes a resistance 508 through which output current of the power adaptor 202 may flow. As the output current of the power adaptor 202 may vary, the output wattage of the power adaptor 202 may also vary. The comparator 502 may sense the output wattage and compare the adaptor loading threshold value with the output wattage of the power adaptor 202. In case, the output wattage of the power adaptor 202 is greater than the adaptor loading threshold value, a comparator output signal 510 of the comparator 502 may operate in a high-level mode.

Further, sensor signal 512 indicates the user touch indication using the proximity sensor 204. If the user touch is detected, the sensor signal 512 may operate in a high-level mode. If no user touch is detected by the proximity sensor 204, the sensor signal 512 may operate in a low-level mode. Block 514 illustrates exemplary events where a low-level mode 516 of the sensor signal 512 illustrates no user touch. Further, a high-level mode 518 of the sensor signal 512 illustrates a user touch indication. In one example, the sensor signal 512 may operate at 0V in case of a low-level mode 516. Further, the sensor signal 512 may operate at 1V in case of the high-level mode 518.

The control circuit 206 further includes a decision block 520. In one example, the decision block 520 may be an AND gate. If input signals to the decision block 520 operate in a high-level mode, an output signal 522 of the decision block 520 may change from a low voltage signal to a high voltage signal. Thus, if the comparator output signal 510 of the comparator 502 and the sensor signal 512 operate at the high-level mode (1V), the decision block 520 may generate the output signal 522 at 1V. In one example, the decision block 520 may be connected to the configuration pin 414, such that the decision block 520 may transmit the output signal 522 to the configuration pin 414. Thus, in case of the user touch detection, if it is determined that the output wattage is greater than the adaptor loading threshold value, the comparator output signal 510 and the sensor signal 512 may operate at the high-level mode (1V). The decision block 520 may thus generate the output signal 522 at 1V, thereby, operating the configuration pin 414 in a low output mode.

In case either of the comparator output signal 510 and the sensor signal 512 may operate at the low-level mode (0V), the decision block 520 may generate the output signal 522 at 0V, thereby, allowing the configuration pin 414 to operate in the high output mode.

Figure 6:
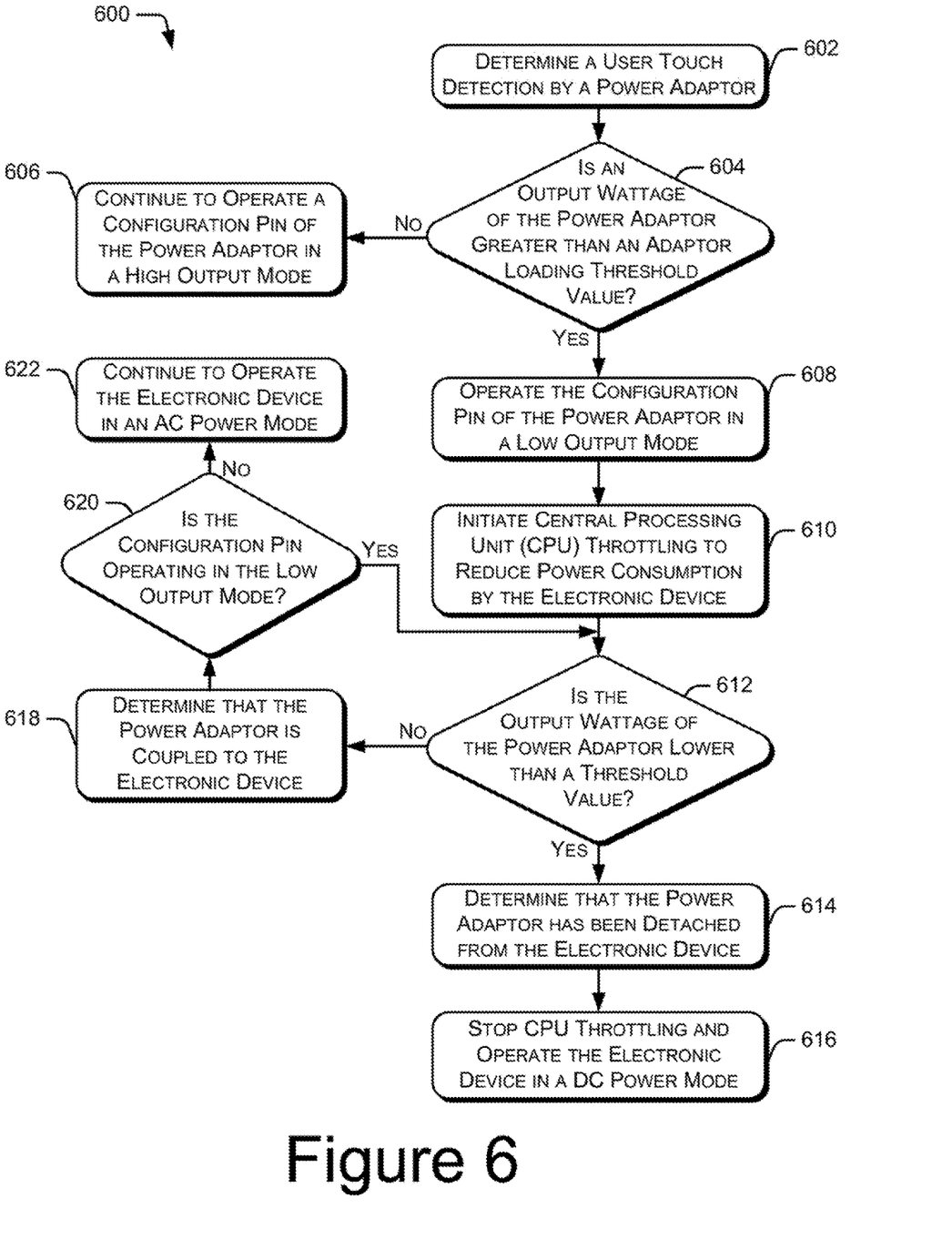
FIG. 6 illustrates a method for power supply switching from AC to DC power source in an electronic device, according to an example.

FIG. 6 illustrates a method 600 for power supply switching from AC to DC power source in an electronic device, according to an example implementation of the present subject matter. The order in which the methods are described is not intended to be construed as a limitation, and any number of the described method blocks may be combined in any order to implement the methods, or an alternative method.

It may also be understood that method 600 may be performed by programmed computing devices, such as electronic device 102 as depicted in FIGS. 1-4. Furthermore, the method 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the method 600 is described below with reference to the power adaptor 202 and the electronic device 102 of the system 400, other suitable systems for the execution of these methods may also be utilized. Additionally, implementation of the method 600 is not limited to such examples.

At block 602, a user touch detection is determined by a power adaptor coupled to the electronic device. In one example, the user touch detection may indicate a user touch detected on the power adaptor for detachment of the power adaptor from the electronic device. In one example, the power adaptor may include a proximity sensor to generate a user touch indication in response to detecting a user touch on the power adaptor. The power adaptor may further include a control circuit to operate a configuration pin of the power adaptor in a low or high output mode. In one example, the power adaptor may be the power adaptor 202. Further, the electronic device may be the electronic device 102.

At block 604, it is determined whether the output wattage of the power adaptor is greater than an adaptor loading threshold value. In an example, the adaptor loading threshold value may be in a range of 60-80% of the power rating of the power adaptor. In case, it is determined that the output wattage of the power adaptor is less than or equal to the adaptor loading threshold value, ('NO' path from block 604), the control circuit may continue to operate the configuration pin of the power adaptor in a high output mode, at block 606.

In case, it is determined that the output power wattage of the power adaptor is greater than the adaptor loading threshold value, ('YES' path from the block 604), the control circuit may operate the configuration pin of the power adaptor in a low output mode, at block 608.

At block 610, Central Processing Unit (CPU) throttling is initiated to reduce the power consumption by the electronic device. In one example, the electronic device may initiate CPU throttling. In one example, CPU throttling may reduce the operating frequency of the electronic device, thereby reducing the power consumption by the electronic device.

At block 612, it is determined whether the output wattage of the power adaptor is less than a threshold value. In one example, the electronic device may continuously monitor the output wattage being received from the power adaptor to determine whether the output wattage of the power adaptor is lower than the threshold value. The electronic device may then determine whether the power adaptor has been detached from the electronic device 102. In case, it is determined that the output wattage is lower than the threshold value, ('YES' path from block 612), the electronic device may determine that the power adaptor has been detached, at block 614.

At block 616, the electronic device may stop the CPU throttling on determining that the power adaptor has been detached. The electronic device may subsequently perform power supply switching from AC power supply to DC power supply to start operating in the DC power mode. In one example, the electronic device may draw power from a battery, in the DC power mode.

In case, it is determined that the output wattage of the power adaptor is greater than or equal to the threshold value, ('NO' path from block 612), the electronic device may determine that the power adaptor has not been detached from the electronic device, at block 618.

At block 620, it is determined whether the configuration pin of the power adaptor is continually operating in the low output mode. In one example, the electronic device may monitor the configuration pin of the power adaptor to determine whether the configuration pin of the power adaptor is operating in low output mode. In case, it is determined that the configuration pin is operating in the low output mode, ('YES' path from block 620), the electronic device may continue CPU throttling and move to block 610.

In case, it is determined that the configuration pin of the power adaptor is not operating in low output mode, ('NO' path from block 620), the electronic device may continue to operate in the AC power mode, at block 622.

Although examples for the present subject matter have been described in language specific to structural features and/or methods, it should be understood that the appended claims are not limited to the specific features or methods described. Rather, the specific features and methods are disclosed and explained as examples of the present subject matter.

What is claimed is:

1. An electronic device comprising:
    a controller to:
        determine a user touch detection by a power adaptor coupled to the electronic device, the user touch detection indicating a user touch on the power adaptor for detachment of the power adaptor from the electronic device, wherein the power adaptor is to operate the electronic device in an AC power mode;
        in response to determining the user touch detection, initiate central processing unit (CPU) throttling to reduce power consumption by the electronic device;
        stop CPU throttling in response to detecting that the power adaptor has been detached from the electronic device; and
        switch the electronic device to a DC power mode to operate using DC power supplied by a battery of the electronic device in response to power adaptor detachment.

2. The electronic device as claimed in claim 1, wherein the controller is to send a CPU throttling signal to a CPU of the electronic device for initiating the CPU throttling for reducing work load handled by the CPU.

3. The electronic device as claimed in claim 1, wherein the controller is to:
    monitor an output wattage received by the electronic device from the power adaptor, upon initiating the CPU throttling;
    determine that the power adaptor is coupled to the electronic device when the output wattage is greater than a threshold value; and
    determine that the power adaptor is detached from the electronic device when the output wattage is less than or equal to the threshold value.

4. The electronic device as claimed in claim 3, wherein when the output wattage is greater than the threshold value, the controller is to:
    determine if a configuration pin of the power adaptor is continually operating in a low output mode to signal the user touch detection;
    continue CPU throttling in response to determining that the configuration pin is continually operating in the low output mode;
    stop CPU throttling in response to determining that the configuration pin is operating in a high output mode; and
    continue to operate the electronic device in the AC power mode.

5. The electronic device as claimed in claim 1, wherein the controller is to:
    monitor an operating mode of a configuration pin of the power adaptor; and
    ascertain the power adaptor to be signaling the user touch detection, when the configuration pin is operating in a low output mode.

6. A power adaptor comprising:
    a proximity sensor to generate a user touch indication in response to detecting a user touch on the power adaptor at a location proximate to a power jack of the power adaptor; and
    a control circuit to operate a configuration pin of the power adaptor in a low output mode to signal a user touch detection to an electronic device coupled to the power adaptor.

7. The power adaptor as claimed in claim 6, wherein the control circuit is to:
    in response to receiving the user touch indication, determine an output wattage of the power adaptor; and
    compare the output wattage with an adaptor loading threshold value to determine whether to signal the user touch detection to the electronic device.

8. The power adaptor as claimed in claim 7, wherein the control circuit is to:
    signal the user touch detection when the output wattage is greater than the adaptor loading threshold value; and
    determine not to signal the user touch detection when the output wattage is less than the adaptor loading threshold value.

9. The power adaptor as claimed in claim 8, wherein the control circuit is to continue operating the configuration pin of the power adaptor in a high output mode when the output wattage is less than the adaptor loading threshold value.

10. An electronic device comprising:
    a controller to:
        determine an output mode of configuration pin of a power adaptor coupled to the electronic device to determine whether a user touch is detected by the power adaptor;
        determine that the user touch is detected by the power adaptor when a configuration pin of the power adaptor is operating in a low output mode, wherein the power adaptor comprises a proximity sensor to detect a user touch on the power adaptor, and wherein the power adaptor comprises a control circuit to operate the configuration pin in the low output mode in response to the user touch detection; and in response to determining the user touch detection, initiate central processing unit (CPU) throttling to reduce power consumption by the electronic device.

11. The electronic device as claimed in claim 10, wherein the controller is to:
stop CPU throttling in response to detecting that the power adaptor has been detached from the electronic device; and
operate the electronic device in a DC power mode using DC power supplied by a battery of the electronic device, in response to detecting that the power adaptor has been detached from the electronic device.

12. The electronic device as claimed in claim 10, wherein the controller is to:
send a CPU throttling signal to a CPU of the electronic device initiate the CPU throttling for reducing work load handled by the CPU, to reduce the power consumption.

13. The electronic device as claimed in claim 10, wherein the controller is to:
monitor an output wattage received by the electronic device from the power adaptor, upon initiating the CPU throttling;
determine the power adaptor to be coupled to the electronic device when the output wattage is greater than a threshold value; and
determine the power adaptor to have been detached from the electronic device when the output wattage is less than or equal to the threshold value.

14. The electronic device as claimed in claim 13, wherein when the output wattage is greater than the threshold value, the controller is to:
determine if the configuration pin of the power adaptor is continually operating in the low output mode to signal the user touch detection;
continue CPU throttling in response to determining that that the configuration pin is continually operating in the low output mode;
stop CPU throttling in response to determining that the configuration pin is operating in a high output mode; and
continue to operate the electronic device in an AC power mode.

15. The electronic device as claimed in claim 10, further comprising a battery to supply DC power to the electronic device.

\* \* \* \* \*